(12) United States Patent
Zhang et al.

(10) Patent No.: US 11,281,698 B2
(45) Date of Patent: Mar. 22, 2022

(54) DATA CONFIGURATION QUERY METHOD AND DEVICE

(71) Applicant: Kuyun (Shanghai) Information Technology Co., Ltd., Shanghai (CN)

(72) Inventors: Yifan Zhang, Shanghai (CN); Yifei Wu, Shanghai (CN); Yang Li, Shanghai (CN); Qing Han, Shanghai (CN)

(73) Assignee: KUYUN (SHANGHAI) INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/051,008

(22) PCT Filed: Mar. 4, 2020

(86) PCT No.: PCT/CN2020/077710
§ 371 (c)(1),
(2) Date: Oct. 27, 2020

(87) PCT Pub. No.: WO2020/187023
PCT Pub. Date: Sep. 24, 2020

(65) Prior Publication Data
US 2021/0406281 A1    Dec. 30, 2021

(30) Foreign Application Priority Data
Mar. 20, 2019   (CN) .......................... 201910214615.7

(51) Int. Cl.
*G06F 16/28*      (2019.01)
*G06F 11/34*      (2006.01)
*G06F 16/2453*    (2019.01)

(52) U.S. Cl.
CPC ........ *G06F 16/283* (2019.01); *G06F 11/3409* (2013.01); *G06F 16/24542* (2019.01)

(58) Field of Classification Search
CPC ............ G06F 16/283; G06F 16/24542; G06F 11/3409
(Continued)

(56) References Cited

U.S. PATENT DOCUMENTS 6,446,059 B1 *  9/2002  Berger .................. G06F 16/283
2002/0143755 A1  10/2002  Wynblatt et al.
(Continued)

FOREIGN PATENT DOCUMENTS

CN       101197876 A       6/2008
CN       101673287 A       3/2010
(Continued)

OTHER PUBLICATIONS

International Search Report Application No. PCT/CN2020/077710; dated Jun. 5, 2020; pp. 4.

*Primary Examiner* — Hares Jami
(74) *Attorney, Agent, or Firm* — Cantor Colburn LLP

(57) ABSTRACT

The present application discloses a data configuration query method and device. The method includes: determining at least two target data sets required to be queried by a query instruction and an ordered association between the target data sets, wherein the ordered association at least includes a unidirectional association and/or a bidirectional association; generating, on the basis of the at least two target data sets and the ordered association between the target data sets, a target association path; and outputting an OLAP model conforming to the target association path in a database. According to the present application, the technical problems of a large demand quantity of OLAP models included in an OLAP query system and a low utilization rate of the OLAP models in the related art can be solved.

6 Claims, 3 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 2008/0256121 | A1* | 10/2008 | Liu ....................... | G06F 16/283 |
| 2015/0199378 | A1* | 7/2015 | Reyntjens ................ | G06N 5/00 |
| | | | | 707/754 |
| 2016/0259832 | A1* | 9/2016 | Shore .................... | G06F 16/283 |
| 2018/0349456 | A1* | 12/2018 | Pogrebtsov ........... | G06F 16/248 |
| 2020/0012741 | A1* | 1/2020 | Bracholdt ............. | G06F 16/288 |

FOREIGN PATENT DOCUMENTS

| | | | |
|---|---|---|---|
| CN | 103927337 | A | 7/2014 |
| CN | 104361118 | A | 2/2015 |
| CN | 104391928 | A | 3/2015 |
| CN | 105550241 | A | 5/2016 |
| CN | 106372190 | A | 2/2017 |
| CN | 106844703 | A | 6/2017 |
| CN | 107729500 | A | 2/2018 |
| CN | 208207819 | U | 12/2018 |
| CN | 109117429 | A | 1/2019 |
| CN | 109977175 | A | 7/2019 |
| WO | 2013155751 | A1 | 10/2013 |

* cited by examiner

DATA CONFIGURATION QUERY METHOD AND DEVICE

CROSS-REFERENCE TO RELATED APPLICATIONS

This application is a National Phase of PCT Application No. PCT/CN2020/077710 filed Mar. 4, 2020 which claims priority to Chinese Application No. 2019102146157 filed on Mar. 20, 2019, entitled "DATA CONFIGURATION QUERY METHOD AND DEVICE", which is incorporated herein by reference in its entirety.

FIELD

The present application relates to a technical field of data configuration queries, and more particularly, to a data configuration query method and device.

BACKGROUND

In the present datamation era, how to analyze massive and complex data by means of Online Analytical Processing (OLAP) to assist business decision-making is an important topic in the field of business intelligence and data analysis; and a data model is the basis of OLAP analysis. The architecture bottom layer of the OLAP analysis is a data warehouse, which includes a series of data tables; according to service analysis demands, modeling personnel design a data model based on the tables for analysts to use; and finally, the analysis operation of an analyst can be converted into a series of structured query language (SQL) queries on the data tables. The data model endows the data tables with service meaning and decouples the relationship between the data bottom layer and the service demand, and how to effectively and associatively query the model and utilize the OLAP analysis to serve the service to the maximum extent is a very important part.

An OLAP data model is a core element of an OLAP analysis engine on the basis of data processing logic and serves SQL service queries, so that feature information is closely related to the content mode of the SQL queries; basic information includes a fact table, a dimension table, an association mode, dimensions, measurement and the like; sometimes, one service query is associated with a specific model, however, cross analysis of different service data needs to be used in relatively complex scenes at other times, and a final analysis result can be obtained by using mutual combination of models often.

The process of querying a related OLAP model by means of SQL is completed through a query execution engine; and the process mainly includes: analyzing SQL statements, generating an SQL syntax tree, analyzing the SQL syntax tree, converting the same into a query execution plan (a query execution process), confirming an OLAP model, generating a physical execution plan, extracting a pre-calculation result, combining and analyzing the pre-calculation result, and outputting a final result.

Due to the fact that the selection and matching logic of the OLAP model in a query engine is relatively fixed, a target model is required strictly in the entire process and cannot adapt to an equivalent or similar model. Therefore, the number of OLAP models in the system will increase along with continuous increase of queries, which brings difficulties and challenges to storage, management, operation and maintenance of the whole system.

As for the technical problems of a large demand quantity of OLAP models included in an OLAP query system and a low utilization rate of the OLAP models in the related art, no effective solutions have yet been proposed.

SUMMARY

A main objective of the present application is to provide a data configuration query method and device, to solve the problems of large demand quantity of OLAP models included in an OLAP query system and a low utilization rate of the OLAP models in the related art.

For achieving the object, in a first aspect, the present application provides a data configuration query method, which is applied to the online analytical processing (OLAP) query system, and the method includes:

Determining at least two target data sets required to be queried by a query instruction and an ordered association between the target data sets, wherein the ordered association at least includes a unidirectional association and/or a bidirectional association;

Generating, on the basis of the at least two target data sets and the ordered association between the target data sets, a target association path; and Outputting an OLAP model conforming to the target association path in a database.

Optionally, the determining the at least two target data sets required to be queried by the query instruction and the ordered association between the target data sets includes:

Identifying, on the basis of character sequence information of the query instruction, the at least two target data sets and association information between the target data sets;

Determining whether the association information between the two target data sets is contained in equivalent association information; and Determining that the ordered association between two target data sets is the bidirectional association, when the association information between two target data sets is contained in the equivalent association information.

Optionally, the determining the at least two target data sets required to be queried by the query instruction and the ordered association between the target data sets further includes:

Determining that the ordered association between the two target data sets is the unidirectional association, when the association information between the two target data sets is not contained in the equivalent association information.

Optionally, the outputting the OLAP model conforming to the target association path in the database includes:

Screening out, in the database, the OLAP model only containing the at least two target data sets required to be queried by the query instruction;

Taking any target data set contained in the OLAP model as a candidate center to match the target association path, and determining whether the OLAP model conforms to the target association path; and Outputting the OLAP model, when the OLAP model conforms to the target association path.

In a second aspect, the present application further provides a data configuration query device, which is applied to the OLAP query system, and the device includes:

A determination module, configured to determine at least two target data sets required to be queried by a query instruction and an ordered association between the target data sets, wherein the ordered association at least includes a unidirectional association and/or a bidirectional association;

A generation module, configured to generate, on the basis of the at least two target data sets and the ordered association between the target data sets, a target association path; and An output module, configured to output an OLAP model conforming to the target association path in the database.

Optionally, the determination module is configured to:

Identify, on the basis of character sequence information of the query instruction, the at least two target data sets and the association information between the target data sets;

Determine whether the association information between the two target data sets is contained in equivalent association information; and Determine that the ordered association between two target data sets is the bidirectional association, when the association information between two target data sets is contained in the equivalent association information.

Optionally, the determination module is configured to:

Determine that the ordered association between the two target data sets is the unidirectional association, when association information between the two target data sets is not contained in the equivalent association information.

Optionally, the output module is configured to:

Screen out, in the database, the OLAP model only containing the at least two target data sets required to be queried by the query instruction;

Take any target data set contained in the OLAP model as a candidate center to match the target association path, and determine whether the OLAP model conforms to the target association path; and Output the OLAP model, when the OLAP model conforms to the target association path.

In a third aspect, the present application further provide a computer device, which includes:

One or more processors; and

A memory, configured to store one or more computer programs;

The one or more computer programs, when executed by the one or more processors, cause the one or more processors to implement the data configuration query method mentioned above.

In a fourth aspect, the present application further provides a computer-readable storage medium, having computer codes stored thereon, and the computer codes, when executed, cause the data configuration query method mentioned above to be performed.

According to the data configuration query method provided in the present application, the method includes determining the at least two target data sets required to be queried by the query instruction and the ordered association between the target data sets, wherein the ordered association at least includes the unidirectional association and/or the bidirectional association; generating, on the basis of the at least two target data sets and the ordered association between the target data sets, the target association path; and outputting the OLAP model conforming to the target association path in the database. By means of the method, the bidirectional association between the target data sets can be confirmed, and the equivalent or similar OLAP model can be replaced with one of OLAP data, such that the application range of the OLAP data model is enlarged, the demand quantity of OLAP models is reduced, the OLAP model utilization rate is increased, the existing OLAP model is reused to the maximum extent, a redundant model caused by supporting a similar analysis process in the past is avoided, and the query execution efficiency is improved; therefore, the technical problems of a large demand quantity of OLAP models and a low utilization rate of the OLAP models included in the OLAP query system in the related art are solved.

BRIEF DESCRIPTION OF THE DRAWINGS

The accompanying drawings, which form a part of the present application, serve to provide a further understanding of the present application, such that other features, objectives, and advantages of the present application become more apparent. The accompanying drawings of illustrative embodiments of the present application and the description of the drawings serve to explain the present application and are not construed as unduly limiting the present application. In the drawings.

DETAILED DESCRIPTION OF THE EMBODIMENTS

In order to enable those skilled in the art to better understand the solutions of the present application, the technical solutions of embodiments of the present application will be described below clearly and comprehensively in conjunction with accompanying drawings of the embodiments of the present application. Apparently, the embodiments described are merely some of rather than all of the embodiments of the present application. Based on the embodiments of the present application, all other embodiments obtained by those of ordinary skill in the art without inventive efforts should fall within the scope of protection of the present application.

It should be noted that the terms "first", "second" and so forth, in the description and claims of the present application and in the above-described drawings, are used to distinguish between similar objects and not necessarily to describe a particular order or sequential order. It should be understood that the data so used may be interchanged where appropriate in order to facilitate the embodiments of the present application described herein. In addition, the terms "comprising", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to these processes, methods, products, or devices.

It should be noted that the embodiments of the present application and the features of the embodiments may be combined with each other without conflict. The present application will be described in detail below with reference to the accompanying drawings in conjunction with embodiments.

Figure 1:
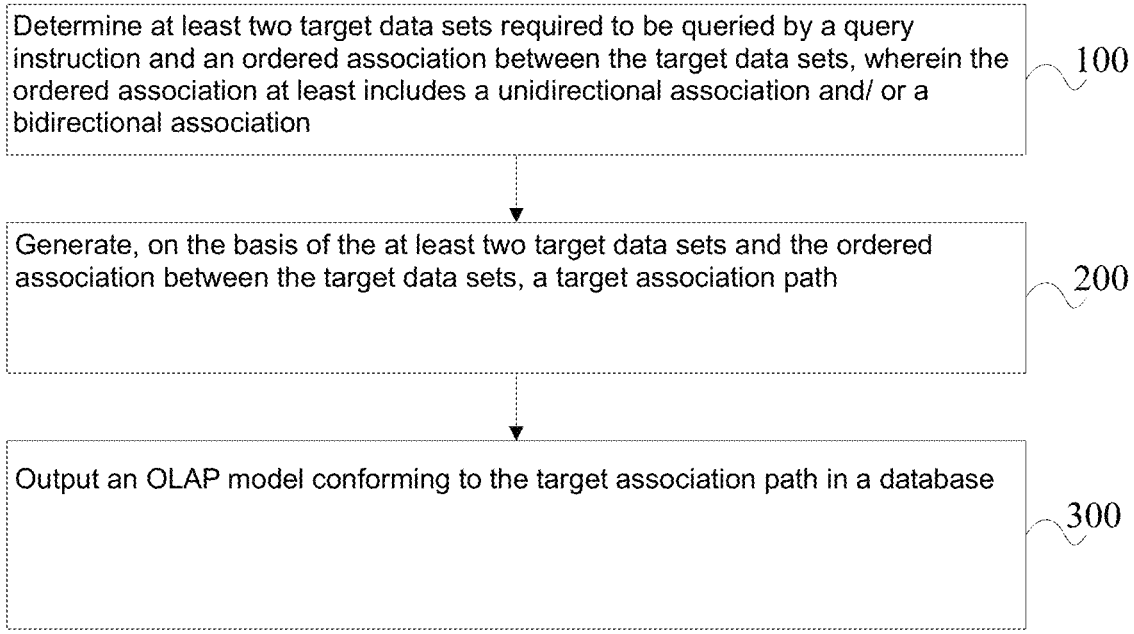
FIG. 1 is a schematic flowchart of a data configuration query method provided in an embodiment of the present application.

According to one aspect of the present application, an embodiment of the present application provides a data configuration query method, which is applied to an OLAP query system. FIG. 1 is a schematic flowchart of the data configuration query method provided in the embodiment of the present application, and as shown in FIG. 1, the method includes the following steps 100 to 300:

100: determining at least two target data sets required to be queried by a query instruction and an ordered association between the target data sets, wherein the ordered association at least includes a unidirectional association and/or a bidirectional association.

Wherein the query instruction may be an instruction input for querying service by a user through a user side, the query instruction at least includes an instruction character sequence, for example, the query instruction is an SQL query instruction for SQL service, and the query instruction includes information of a plurality of target data sets and association information between the target data sets, such that the ordered association between the target data sets can be determined according to the association information, and the ordered association at least includes the unidirectional association and/or the bidirectional association.

Figure 6:
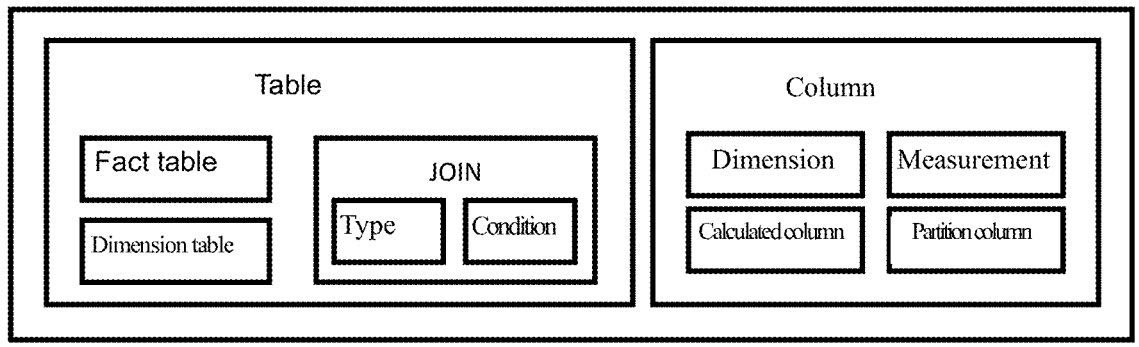
FIG. 6 is a schematic diagram of an OLAP model provided in an embodiment of the present application.

Illustratively, the query instruction is the SQL query instruction for the SQL service, the query instruction includes information of four target data sets A, B, C and D and the association information between the target data sets, the association information between A and B is INNER JOIN, the association information between A and D is LEFT JOIN, and the association information between B and C is LEFT JOIN, such that it can be determined that the ordered association between A and D is a unidirectional association of A to D, the ordered association between B and C is a unidirectional association of B to C, and the association information INNER JOIN between A and B belongs to an equivalent association, namely, "A INNER JOIN B" and "B INNER JOIN A" can be expressed in a unified manner, only one OLAP model needs to be defined, and the ordered association between A and B is a bidirectional association between A and B. Wherein, the OLAP model can be shown in FIG. 6.

200: generating, on the basis of the at least two target data sets and the ordered association between the target data sets, a target association path.

Specifically, on the basis of the ordered association between all the target data sets required to be queried by the query instruction, on the basis of the fact that all the target data sets required by the query instruction are associated, and further on the basis of the ordered association between the target data sets, all the target data sets can be connected in series, and due to the ordered association, a directed target data set series path, namely the target association path, can be generated, and the target association path can express a data set association relationship in a directed graph manner.

Figure 2:
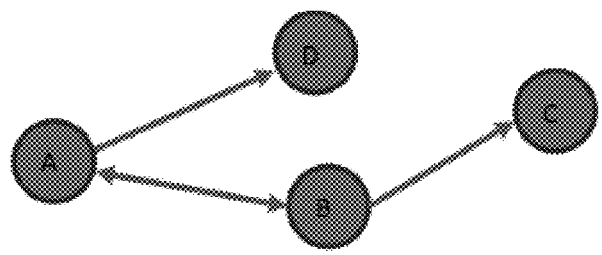
FIG. 2 is a directed graph of a target association path provided in an embodiment of the present application.

Illustratively, the query instruction includes information of four target data sets A, B, C and D and association information between the target data sets, an ordered association between A and D is the unidirectional association from A to D, an ordered association between B and C is the unidirectional association from B to C, an ordered association between A and B is the bidirectional association between A and B, a directed graph representing the target association path is as shown in FIG. 2, the target association path may start from A or B, namely, the target association path includes two paths, the first path is: A is associated to B and then associated to C, and A is associated to D, and the second path is: B is associated to A and then associated to B, and B is associated to C, such that the requirement of the query instruction can be achieved when an OLAP model conforming to the first path or an OLAP model conforming to the second path exists, and the OLAP model conforming to the first path and the OLAP model conforming to the second path are the same in expression manner, such that only one OLAP model needs to be defined in the OLAP query system.

300: outputting the OLAP model conforming to the target association path in a database.

Specifically, the OLAP model conforming to the target association path is matched in the database, and the OLAP model is output. In this way, the equivalent or similar OLAP model can be replaced with one of OLAP data, such that the application range of the OLAP data model is enlarged, the demand quantity of OLAP models is reduced, the OLAP model utilization rate is increased, the existing OLAP model is reused to the maximum extent, a redundant model caused by supporting a similar analysis process in the past is avoided, and the query execution efficiency is improved.

Figure 3:
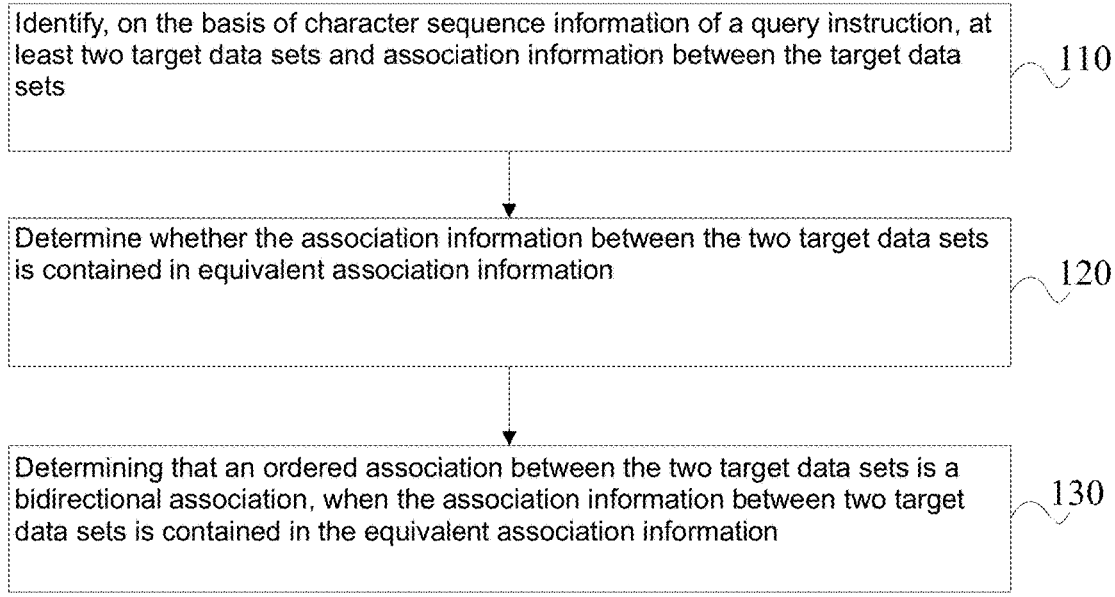
FIG. 3 is a schematic flowchart of step 100 provided in an embodiment of the present application.

In a feasible implementation mode, FIG. 3 is a schematic flowchart of the step 100 provided in an embodiment of the present application, and as shown in FIG. 3, the step 100 of determining the at least two target data sets required to be queried by the query instruction and the ordered association between the target data sets includes the following step 110 to step 130:

110: identifying, on the basis of character sequence information of the query instruction, the at least two target data sets and the association information between the target data sets;

120: determining whether the association information between the two target data sets is contained in equivalent association information; and 130: determining that the ordered association between two target data sets is the bidirectional association, when the association information between two target data sets is contained in the equivalent association information.

Specifically, the step 100 specifically includes: identifying, on the basis of the character sequence information of the query instruction, all target data sets (at least two target data sets) and the associated information (associated characters, such as LEFT JOIN) between the target data sets, then determining whether the associated information between two target data sets belongs to the equivalent association information (equivalent association characters, such as INNER JOIN), and when the association information between two target data sets is contained in the equivalent association information, determining that the ordered association between the two target data sets is the bidirectional association.

Figure 4:
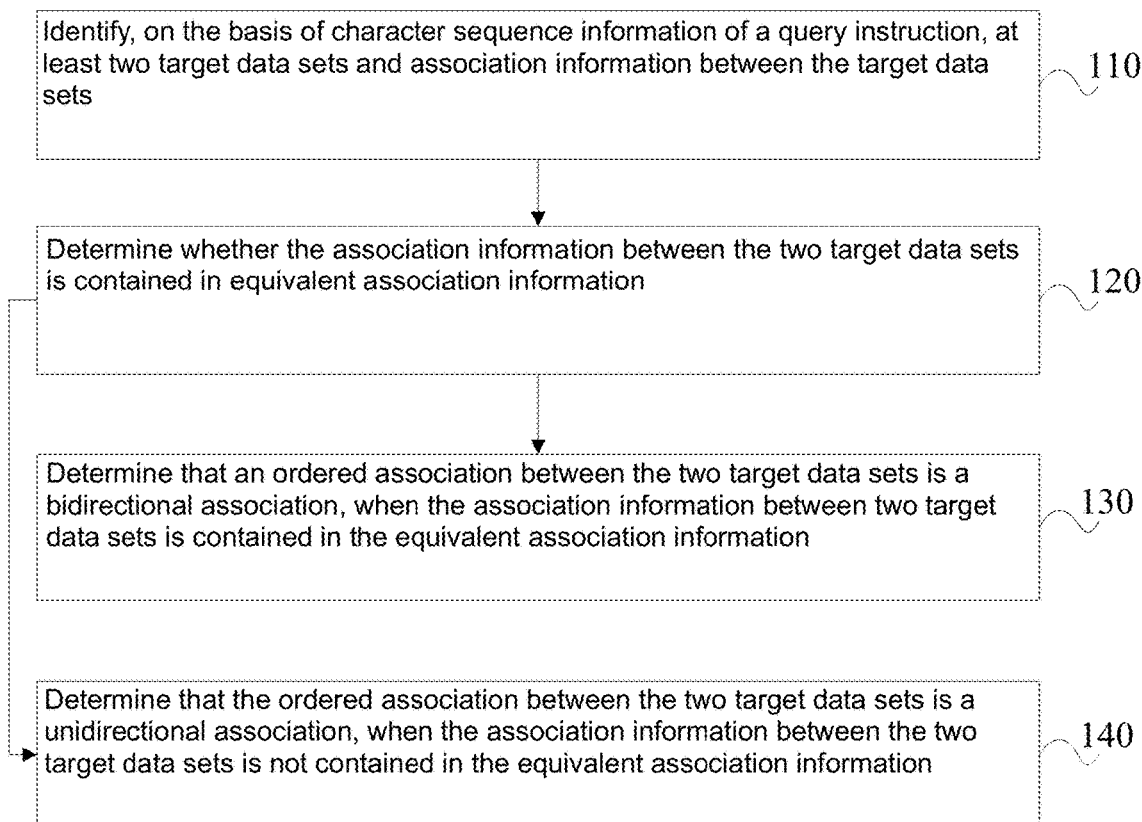
FIG. 4 is a schematic flowchart of another step 100 provided in an embodiment of the present application.

In a feasible implementation mode, FIG. 4 is a schematic flowchart of another step 100 provided in an embodiment of the present application, and as shown in FIG. 4, the step 100 of determining the at least two target data sets required to be queried by the query instruction and the ordered association between the target data sets further includes the following step 140:

140: determining that the ordered association between the two target data sets is the unidirectional association, when the association information between the two target data sets is not contained in the equivalent association information.

Specifically, when it is determined whether the association information between two target data sets belongs to the equivalent association information (the equivalent association characters, for example, INNER JOIN belongs to the equivalent association characters), if it is determined that the association information between two target data sets is not contained in the equivalent association information (for example, LEFT JOIN does not belong to the equivalent association characters), it is determined that the ordered association between the two target data sets is the unidirectional association. In this way, by means of the steps 110 to 140, the ordered association between the target data sets may be determined.

Figure 5:
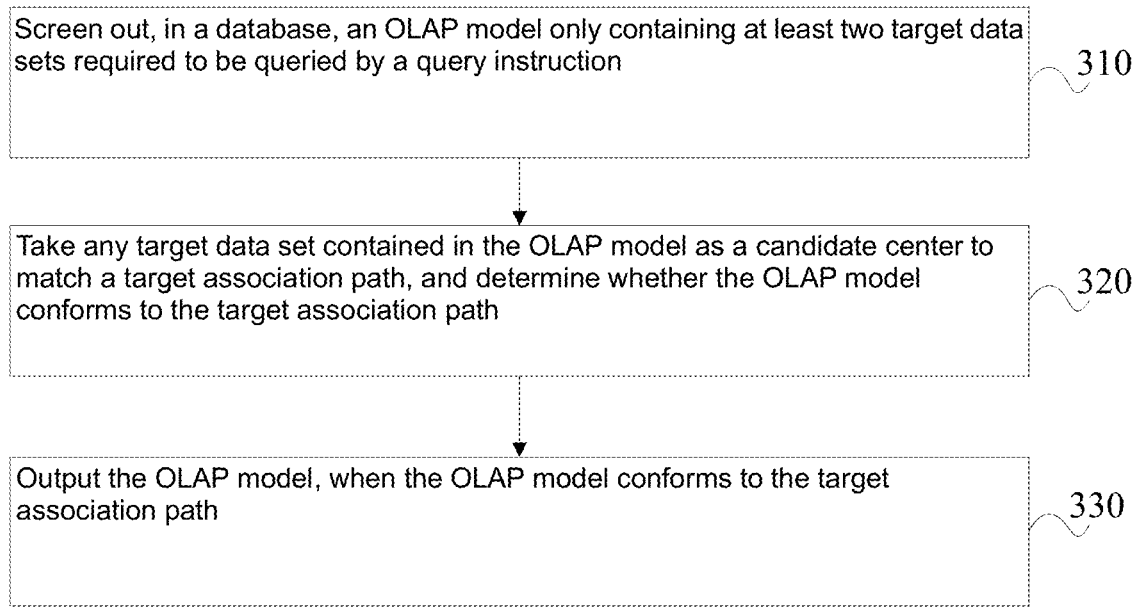
FIG. 5 is a schematic flowchart of step 300 provided in an embodiment of the present application.

In a feasible implementation mode, FIG. 5 is a schematic flowchart of the step 300 provided in an embodiment of the present application, and as shown in FIG. 5, the step 300 of outputting the OLAP model conforming to the target association path in the database includes the following steps 310 to 330:

310: screening out, in the database, the OLAP model only containing the at least two target data sets required to be queried by the query instruction;

320: taking any target data set contained in the OLAP model as a candidate center to match the target association path, and determining whether the OLAP model conforms to the target association path; and 330: outputting the OLAP model, when the OLAP model conforms to the target association path.

Specifically, the OLAP model only containing all target data sets is determined on the basis of the at least two target data sets required to be queried by the query instruction, for each OLAP model only containing the at least two target data sets required to be queried by the query instruction, any target data set contained in the OLAP model is served as the candidate center to match the target association path, whether the OLAP model conforms to the target association path is determined, and when the OLAP model conforms to the target association path, the OLAP model is output to be subsequently processed.

According to the data configuration query method provided in the present application, the method includes determining the at least two target data sets required to be queried by the query instruction and the ordered association between the target data sets, wherein the ordered association at least includes the unidirectional association and/or the bidirectional association; generating, on the basis of the at least two target data sets and the ordered association between the target data sets, the target association path; and outputting the OLAP model conforming to the target association path in the database. By means of the method, the bidirectional association between the target data sets can be confirmed, and the equivalent or similar OLAP model can be replaced with one of OLAP data, such that the application range of the OLAP data model is enlarged, the demand quantity of OLAP models is reduced, the OLAP model utilization rate is increased, the existing OLAP model is reused to the maximum extent, a redundant model caused by supporting a similar analysis process in the past is avoided, and the query execution efficiency is improved; therefore, the technical problems of a large demand quantity of OLAP models and a low utilization rate of the OLAP models included in the OLAP query system in the related art are solved.

Figure 7:
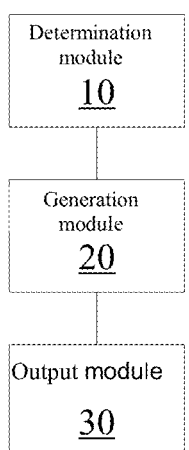
FIG. 7 is a schematic structural diagram of a data configuration query device provided in an embodiment of the present application.

Based on the same technical concept, the present application further provides a data configuration query device. FIG. 7 is a schematic structural diagram of the data configuration query device provided in an embodiment of the present application, and as shown in FIG. 7, the device is applied to the OLAP query system, and the device includes:

A determination module 10, configured to determine at least two target data sets required to be queried by the query instruction and an ordered association between the target data sets, wherein the ordered association at least includes a unidirectional association and/or a bidirectional association;

A generation module 20, configured to generate, on the basis of the at least two target data sets and the ordered association between the target data sets, a target association path; and An output module 30, configured to output an OLAP model conforming to the target association path in a database.

Optionally, the determination module 10 is configured to:

Identify, on the basis of character sequence information of the query instruction, the at least two target data sets and the association information between the target data sets;

Determine whether association information between two target data sets is contained in equivalent association information; and Determine that the ordered association between two target data sets is the bidirectional association, when the association information between two target data sets is contained in the equivalent association information.

Optionally, the determination module 10 is configured to:

Determine that the ordered association between the two target data sets is the unidirectional association, when the association information between the two target data sets is not contained in the equivalent association information.

Optionally, the output module 30 is configured to:

Screen out, in the database, the OLAP model only containing the at least two target data sets required to be queried by the query instruction;

Take any target data set contained in the OLAP model as a candidate center to match the target association path, and determine whether the OLAP model conforms to the target association path; and Outputting the OLAP model, when the OLAP model conforms to the target association path.

According to the data configuration query device provided in the present application, the determination module 10 is configured to determine the at least two target data sets required to be queried by the query instruction and the ordered association between the target data sets, wherein the ordered association at least includes the unidirectional association and/or the bidirectional association; the generation module 20 is configured to generate, on the basis of the at least two target data sets and the ordered association between the target data sets, the target association path; and the output module 30 is configured to output the OLAP model conforming to the target association path in the database. In this way, the bidirectional association between the target data sets can be confirmed, and the equivalent or similar OLAP model can be replaced with one of OLAP data, such that the application range of the OLAP data model is enlarged, the demand quantity of OLAP models is reduced, the OLAP model utilization rate is increased, the existing OLAP model is reused to the maximum extent, a redundant model caused by supporting a similar analysis process in the past is avoided, and the query execution efficiency is improved; and therefore, the technical problems of a large demand quantity of OLAP models and a low utilization rate of the OLAP models included in the OLAP query system in the related art are solved.

Based on the same technical concept, an embodiment of the present application further provide a computer device, which includes:

One or more processors; and

A memory, configured to store one or more computer programs;

The one or more computer programs, when executed by the one or more processors, cause the one or more processors to implement the data configuration query method mentioned above.

Based on the same technical concept, an embodiment of the present application further provides a computer-readable storage medium, having computer codes stored thereon, and the computer codes, when executed, cause the data configuration query method mentioned above to be performed.

Obviously, those skilled in the art should appreciate that the modules or steps of the present invention mentioned above may be implemented with a general-purpose computation device, and may be centralized on a single computation device or distributed on a network composed of a plurality of computation devices, Optionally, they may be implemented with program codes executable by the computation device, such that the they may be stored in a storage device to be executed by the computation device, or they may be fabricated separately as individual integrated circuit modules, or multiple modules or steps of them may be fabricated as a single integrated circuit module for implementation. Thus, the present invention is not limited to any particular combination of hardware and software.

The computer programs involved in the present application may be stored in the computer-readable storage medium, which may include: any physical device, virtual device, USB flash disk, removable hard disk, magnetic disk, optical disk, computer memory, read-only computer memory (ROM), random access memory (RAM), electrical carrier signal, and telecommunication signal, and other software distribution media capable of carrying the computer program codes.

Obviously, those skilled in the art should appreciate that the modules or steps of the present invention mentioned above may be implemented with a general-purpose computation device, and may be centralized on a single computation device or distributed on a network composed of a plurality of computation devices, Optionally, they may be implemented with program codes executable by the computation device, such that the they may be stored in a storage device to be executed by the computation device, or they may be fabricated separately as individual integrated circuit modules, or multiple modules or steps of them may be fabricated as a single integrated circuit module for implementation. Thus, the present invention is not limited to any particular combination of hardware and software.

The foregoing is merely illustrative of the preferred embodiments of the present application and is not intended to limit the present application, and various changes and modifications may be made on the present application by those skilled in the art. Any modifications, equivalent substitutions, improvements, and the like within the spirit and principles of the present application should all fall within the scope of protection of the present application.

What is claimed is:

1. A data configuration query method, applied to an online analytical processing (OLAP) query system, the method comprising:
   determining at least two target data sets required to be queried by a query instruction and an ordered association between the target data sets, wherein the ordered association at least comprises a unidirectional association and/or a bidirectional association;
   generating, on the basis of the at least two target data sets and the ordered association between the target data sets, a target association path; and
   outputting an OLAP model conforming to the target association path in a database,
   the determining of the at least two target data sets required to be queried by the query instruction and the ordered association between the target data sets includes:
   identifying, on the basis of character sequence information of the query instruction, the at least two target data sets and association information between the target data sets;
   determining whether the association information between the two target data sets is contained in equivalent association information; and
   determining that the ordered association between the two target data sets is a bidirectional association, when the association information between the two target data sets is contained in the equivalent association information,
   the outputting of the OLAP model conforming to the target association path in the database includes:
   screening out, in the database, the OLAP model only containing the at least two target data sets required to be queried by the query instruction;
   taking any target data set contained in the OLAP model as a candidate center to match the target association path, and determining whether the OLAP model conforms to the target association path; and
   outputting the OLAP model, when the OLAP model conforms to the target association path.

2. The data configuration query method according to claim 1, wherein the determining the at least two target data sets required to be queried by the query instruction and the ordered association between the target data sets includes:
   determining that the ordered association between the two target data sets is a unidirectional association, when the association information between the two target data sets is contained in the equivalent association information.

3. A data configuration query device, applied to an OLAP query system, the device comprising:
   one or more processors configured to execute:
   a determination module, configured to determine at least two target data sets required to be queried by a query instruction and an ordered association between the target data sets, wherein the ordered association at least includes a unidirectional association and/or a bidirectional association;
   a generation module, configured to generate, on the basis of the at least two target data sets and the ordered association between the target data sets, a target association path; and
   an output module, configured to output an OLAP model conforming to the target association path in a database,
   the determination module is configured to:
   identify, on the basis of character sequence information of the query instruction, the at least two target data sets and association information between the target data sets;
   determine whether the association information between the two target data sets is contained in equivalent association information; and
   determine that the ordered association between the two target data sets is the bidirectional association, when the association information between the two target data sets is contained in the equivalent association information,
   the output module is configured to:

screen out, in the database, the OLAP model only containing the at least two target data sets required to be queried by the query instruction;

take any target data set contained in the OLAP model as a candidate center to match the target association path, and determine whether the OLAP model conforms to the target association path; and output the OLAP model, when the OLAP model conforms to the target association path.

4. The data configuration query device according to claim 3, wherein the determination module is configured to:

determine that the ordered association between the two target data sets is the unidirectional association, when the association information between the two target data sets is not contained in the equivalent association information.

5. A computer device, comprising:

one or more processors; and a memory, configured to store one or more computer programs;

the one or more computer programs, when executed by the one or more processors, causing the one or more processors to implement the data configuration query method of claim 1.

6. A non-transitory computer-readable storage medium, having computer codes stored thereon, the computer codes, when executed, causing the data configuration query method of claim 1 to be performed.

* * * * *